R. WASHBURN.
EGG BEATER.
APPLICATION FILED MAY 4, 1908.
948,750.
Patented Feb. 8, 1910.
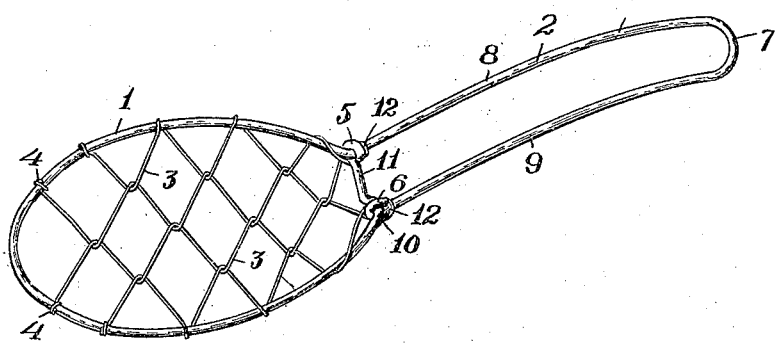
Witnesses
R. D. Tolman.
Penelope Cumberbach.
Inventor
Reginald Washburn.
By Rufus B. Fowler
Attorney

UNITED STATES PATENT OFFICE.

REGINALD WASHBURN, OF WORCESTER, MASSACHUSETTS, ASSIGNOR TO THE WIRE GOODS COMPANY, OF WORCESTER, MASSACHUSETTS, A CORPORATION OF MASSACHUSETTS.

EGG-BEATER.

948,750.  Specification of Letters Patent.  Patented Feb. 8, 1910.

Application filed May 4, 1908. Serial No. 430,644.

*To all whom it may concern:*

Be it known that I, REGINALD WASHBURN, a citizen of the United States, residing at Worcester, in the county of Worcester and Commonwealth of Massachusetts, have invented a new and useful Improvement in Egg-Beaters, of which the following is a specification, accompanied by drawings, forming a part of the same, in which the figure consists of a perspective view of my improved egg beater.

My invention relates to egg beaters in which the frame and handle of the egg beater is made from a single piece of wire, and consists in the construction and arrangement of parts as hereinafter described and pointed out in the annexed claims.

Referring to the accompanying drawing 1 is the frame of the egg beater preferably elliptical and having a handle 2. An interlaced wire 3 connects the sides of the elliptical frame 1 and is looped at intervals around the sides of the frame, with the ends of the wire secured to the frame at 4, 4; but the wire 3 inclosed by the elliptical frame 1 may be of any convenient design or arrangement, and forms no part of my present invention.

The frame 1 and handle 2 are constructed from a single piece of wire having eyes 5 and 6 at its opposite ends. From the eye 5 the wire is bent to form the elliptical frame 1, and passing through the eye 5 is returned upon itself by a semicircular bend at 7, the parallel sections 8 and 9 of the wire forming the handle 2. The section 9 terminates in an eye 6, which incloses a U-shaped loop 10 formed a short distance from the eye 5. That section of the wire at 11 between the loop 10 and the eye 5 serves to space the parallel sections 8 and 9 forming the handle portion of the beater, the loop 10 preventing any lateral movement of the eye 6, but I do not wish to confine myself to the use of the loop 10.

After the wire has been bent as above described to form the elliptical frame 1 and handle 2, a wire 3 is interwoven in the elliptical frame and passed around the handle above the eyes 5 and 6 at 12, 12, in order to tie together more securely the frame and the interwoven wire. The egg beater is then immersed in molten metal, such as tin, zinc or solder, which attaches the interwoven wire to the frame at the points of contact, and also the eyes 5 and 6 to the wires inclosed therein, and it further protects the wires from rust.

I claim—

1. An egg beater, comprising a frame made from a single piece of wire bent to form an inclosing frame and a handle of parallel wires, an eye on one end of said wire engaging one of the parallel wires of the handle, and an eye on the other end of the wire engaging said inclosing frame.

2. An egg beater, comprising a wire bent to form an inclosing frame and a handle, with one end of said wire having an eye engaging one of the wires of said handle and the other end of said wire having an eye engaging said inclosing frame, and an interwoven wire connecting the sides of said frame.

3. An egg beater, comprising an inclosing frame and a handle formed from a single piece of wire, a U-shaped bend in said inclosing frame arranged to be engaged by one end of said wire, and with the other end of said wire engaging the handle at its point of departure from said inclosing frame.

4. An egg beater, comprising an inclosing frame and a handle made from a single piece of wire, the wire in said handle having a return bend with separated parallel sections, with one end of said wire arranged to engage said inclosing frame, and with the other end arranged to engage one of said parallel wires at the point of departure from said inclosing frame, and a wire connecting the sides of said frame.

Dated this second day of May 1908.

REGINALD WASHBURN.

Witnesses:
PENELOPE COMBERBACH,
HENRY WOOD FOWLER.